INVENTOR
HELGE INGVAR SJÖSTEDT
BY Strauch, Nolan + Neale
ATTORNEYS

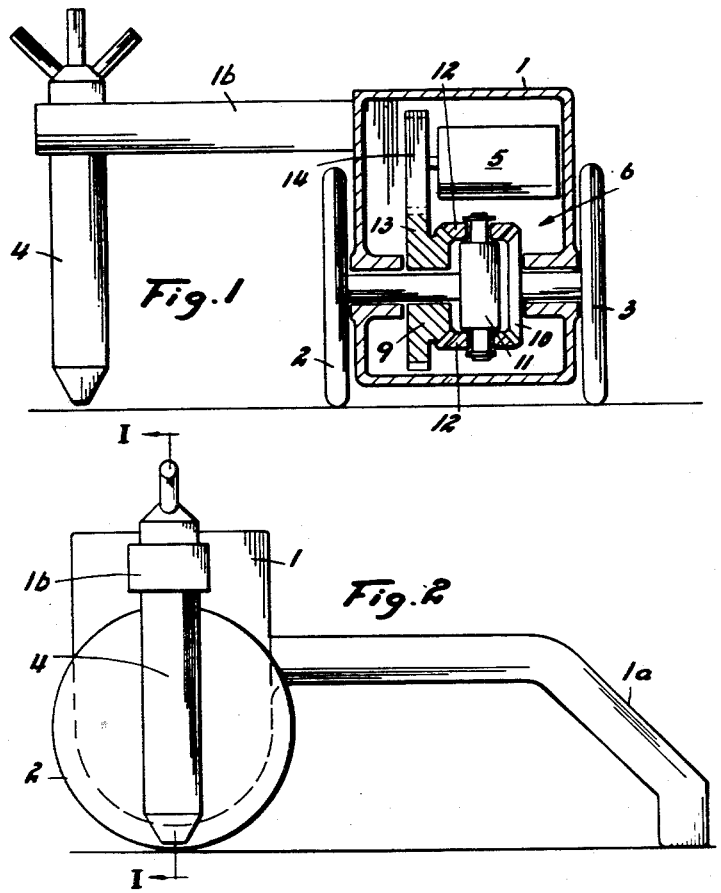

June 14, 1960 H. I. SJÖSTEDT 2,940,748
FLAME CUTTING MACHINES

Original Filed Aug. 23, 1955 3 Sheets-Sheet 3

INVENTOR
HELGE INGVAR SJÖSTEDT
BY Strauch Nolan + Neale
ATTORNEYS

United States Patent Office 2,940,748
Patented June 14, 1960

2,940,748
FLAME CUTTING MACHINES

Helge Ingvar Sjöstedt, Kilian Zollsgatan 29b, Malmo, Sweden

Continuation of application Ser. No. 530,142, Aug. 23, 1955. This application July 21, 1958, Ser. No. 749,766

Claims priority, application Sweden Aug. 28, 1954

9 Claims. (Cl. 266—23)

This invention relates to a flame cutting machine of the type comprising a carriage supporting a blowpipe or similar tool and having a pair of coaxial travelling wheels to be driven and steered on a plane surface of a workpiece by an external force, the blowpipe or similar tool being disposed at one side of the carriage outside the wheels on said carriage side, and is a continuation of my copending application Serial No. 530,142 filed August 23, 1955, now abandoned.

The principal object of the invention is to provide a flame cutting machine of this type having means capable of holding the linear speed of the blowpipe or similar tool constant also on cutting irregular shapes including sharp bends to one or the other side, thus producing even and clean-cut edges so that a further treatment can be dispensed with.

With reference thereto a more specific object of the invention is to provide a flame cutting machine of the above type having a rotary speed governor and a sun-and-planet gear connected between the wheels and the governor at such transmission ratios between the wheels and the speed governor, selected in correspondence with the distances between the wheels and the blowpipe, that the speed equalization produced by the sun-and-planet gear relates to the laterally disposed blowpipe whereby the linear speed of said blowpipe is always proportional to the r.p.m. of the speed governor.

Further objects and advantages of the invention will become apparent from the following description, reference being had to the accompanying diagrammatic drawings in which:

Figure 1 is a cross section on line I—I in Figure 2;

Figure 2 is a side view as seen from the left in Figure 1;

Figure 3:
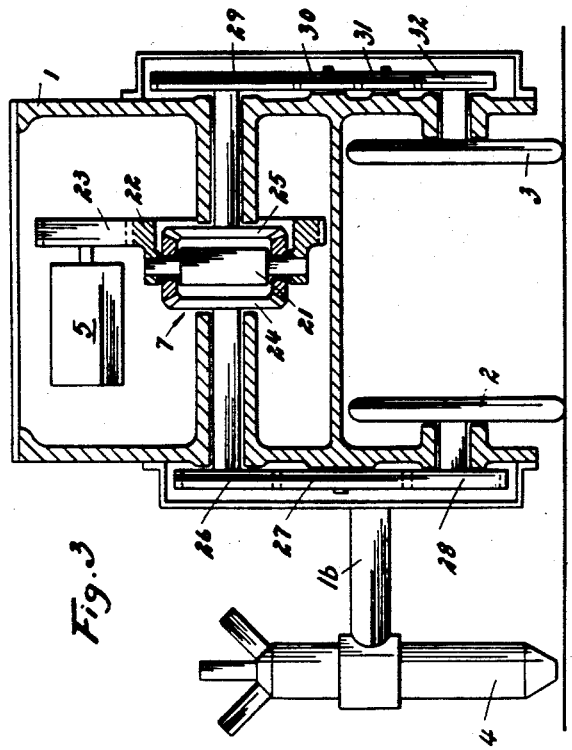
Figure 3 is a cross section through an embodiment in which the sun-and-planet gear is connected in another way than in Figure 1 and is supplemented by additional gearings.
Figure 4:
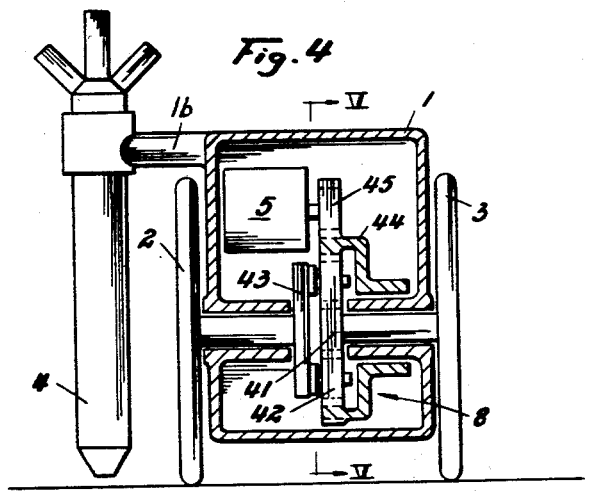
Figure 4 is a cross section through an embodiment including a sun-and-planet gear of another design.

In all embodiments illustrated, the machine comprises a body 1 carried by a pair of coaxial wheels 2, 3 which are mounted on said body. An arm 1b laterally projects from the body 1 and carries at its outer end a blowpipe 4 which is directed towards a point on the prolongation of the straight line between the points of support of wheels 2, 3 on a plane base, as is shown in Figures 1 and 2. The said point defines the position of the blowpipe to the extent required in the present connection. Furthermore, the machine body 1 contains in all embodiments a speed governor 5 and a sun-and-planet gear designated 6, 7 and 8 as shown in Figures 1, 3 and 4 respectively, in the drawings and interposed between the wheels 2, 3 and the speed governor 5. The machine also has a downwardly bent grip 1a which projects from the body 1 at right angles to the wheel axis and whose free end forms a third support for the machine.

The speed governor 5 may be a reversible electric motor with adjustable speed, which also delivers power for the forward motion of the machine, but as an alternative it may be a governor of another type, e.g. a centrifugal governor with a brake. In any case it is supposed to offer so large a resistance to a change or increase in its speed that the external force necessary for steering and possibly driving the machine at correct speed cannot appreciably affect the speed or increase it. The wheels are knurled or otherwise designed to prevent slipping.

Figure 5:
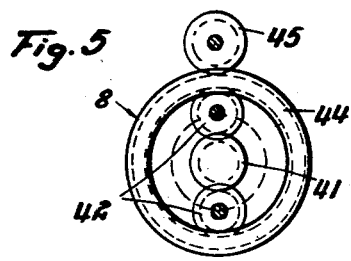
Figure 5 is a section through the sun-and-planet gear on line V—V in Figure 4.

In Figures 1 and 3 the sun-and-planet gear is of the type ordinarily used as a differential gear in automobiles, and in Figures 5 and 6 it is of another type having spur gears. The sun-and-planet gear may possibly consist of a ball or roller bearing, the balls or rollers of which form the planet gears in a planet (ball) cage.

The sun-and-planet gear is not connected in the ordinary way, like the differential gear of an automobile, but adapted to hold the speed of the laterally disposed blowpipe constant, which implies that its equalizing effect, controlled by the governor, is distributed on the two wheels with due regard to their different distances from the blowpipe. As a result thereof, the speed of the carriage proper can vary considerably and also its direction of movement may temporarily be reversed on cutting sharp curves or corners when the carriage is rapidly swung, e.g. through 90° or more, with the blowpipe as the center by the action of an external steering force while the blowpipe continues to move uninterruptedly in the operating direction at the speed defined by the speed governor.

As will appear from Figure 1, in the embodiment shown therein the distance of the blowpipe 4 from the adjacent wheel 2 is equal to the relative distance of the wheels, and the sun-and-planet gear comprises in a known manner two sun wheels 9, 10 which are coaxial to the travelling wheels 2, 3 and are of the same diameter, a planet cage 11 and a plurality of planet gears 12 mounted thereon. The sun wheel 9 on the blowpipe side is freely mounted on the axle of the travelling wheel 2 and provided with a gear rim 13 meshing with a gear 14 on the shaft of the speed governor 5. In normal operation the sun gear 9 thus has a constant r.p.m. which is applied to it by the speed governor or by the speed governor and an external driving force in combination. The other sun wheel 10 is fixedly mounted on the axle of the travelling wheel 3, and the planet cage 11 is fixedly united with the axle of the travelling wheel 2.

It is assumed that the machine operates under rectilinear movement, steered by an external force, in such a direction that the blowpipe is located on the left side as seen in the operating direction, the travelling wheels having the same speed under the control of the speed governor. If the blowpipe is to change direction to the left about a sharp corner, the machine is simply swung in the new direction by manual force exerted on the grip 1a at right angles to the operation direction. As a result, the speed of the two travelling wheels is increased, and thanks to the speed governor and the special manner in which the sun-and-planet gear is connected between said governor and the travelling wheels, the speed of the outer wheel 3 is increased twice as much as that of the inner wheel 2, while the governor maintains the same r.p.m. and the blowpipe continues its forward travel. However, the change of direction can be performed very rapidly, if the machine is small and light, and the arc described by the blowpipe can thus be given so small a radius that it is not perceptible. The machine body proper is thus swung practically with the blowpipe as the center.

If the machine is to be swung to the right from the same normal position, the swinging movement is carried out accordingly. The direction of rotation of the two travelling wheels is now reversed, i.e. their speeds will be negative, and by the action of the speed governor the sun-and-planet gear distributes the change of speed in such a way that for the outer wheel 3 it will be twice as large as that of the inner wheel 2, and the swinging movement is performed, if carried out rapidly, with the blowpipe as the center, while the speed governor—if it is also the drive motor—continuously drives the blowpipe at a constant speed and otherwise gives the required reaction in relation to the sun-and-planet gear, by its inertia.

By swinging the machine more or less rapidly, without any interruption of the drive power, by exerting a lateral force on the grip 1a, it is possible to cause the blowpipe to follow any curves whatever at a constant speed which is determined by the speed governor.

The explanation of these performances lies in the relations of distances and transmission ratios, that will appear from Figure 1. The two sun wheels 9 and 10 being equally large, the transmission ratio of the inner wheel 2, i.e. the wheel adjacent the blowpipe, and the sun wheel 9 which by reason of gearing 13, 14 represents the speed governor, thus will obviously be 1:2, provided that the outer wheel 3 is locked, while the transmission ratio of the outer wheel 3 and the sun wheel 9, provided that the inner wheel 2 is locked, will be 1:1, the direction of rotation being reversed. This corresponds numerically to the distance that the respective wheel is spaced apart from the blowpipe, and if the transmission ratios of the wheels in relation to the speed governor are designated $R_2$ and $R_3$, respectively, and their distances from the blowpipe are designated $a_2$ and $a_3$, respectively, the relation can be expressed by the formula $$\frac{R_2}{-R_3} = \frac{a_2}{a_3}$$

the minus sign indicating that the direction of rotation is reversed for one wheel. It should perhaps be pointed out that this formula relates to the construction proper, and as regards function this formula is valid only in the above-mentioned special case that one wheel 2 or 3 is locked and the machine thus circles, the point of support of the wheel serving as the center, or in the case that the speed governor is locked, i.e. has an r.p.m. of 0, it being then only possible to let the machine make a circular movement with the blowpipe serving as the center.

Figure 3 shows another arrangement of the sun-and-planet gear between the speed governor and the wheels. The said gear is of the same type as in Figure 1, but in Figure 3 it is the planet cage 21 that is provided with a gear rim 22 meshing with a gear 23 on the shaft of the governor, and owing to the location of the blowpipe the two sun wheels 24, 25 are connected to the respective travelling wheel 2, 3 by means of different gear trains 26, 27, 28 and 29, 30, 31, 32, respectively. The gear train of the outer wheel 3 contains one gear more than that of the inner wheel 2, and as compared with the latter gear train it gives half as large a transmission ratio between the wheel and the speed governor, corresponding to the fact that the distance between the blowpipe 4 and the outer wheel 3 is twice as large as that between the blowpipe and the inner wheel 2.

Figures 4 and 5 show a sun-and-planet gear 8 having only spur gears. It has an inner sun wheel 41 which is secured to the axle of the outer wheel 3 and meshes with a plurality of planet gears 42 which are mounted in a planet cage 43 secured to the axle of the inner wheel 2 and mesh with an outer sun wheel 44 mounted for free rotation in the machine body and having an external gear rim meshing with a gear 45 on the shaft of the speed governor.

In this embodiment the blowpipe has been disposed closer to the inner wheel but in a simple distance relation to the wheels inasmuch as its distance to the inner wheel is one fourth of its distance to the outer wheel. Accordingly, the diameter of the inner sun wheel 41 of the sun-and-planet gear is one third of the diameter of its outer sun wheel 44, and the transmission ratio of the outer wheel to the outer sun wheel 44 representing the speed governor is thus minus 3:1, the inner wheel 2 being locked, while the transmission ratio of the inner wheel 2 to the sun wheel 44 is 3:4, the outer wheel 3 being locked. The relation of the two transmission ratios is thus numerically the same as between the distances of the wheels 2, 3 to the blowpipe, viz. 1:4, though of the opposed sign.

The laterally disposed blowpipe 4 need not be arranged exactly on the prolongation of the wheel axis. For, on cutting sharp curves, the steering of the machine may be facilitated if the blowpipe is displaced somewhat forwards from this line. It is true that an error in the blowpipe speed is introduced by this arrangement, but as a rule this error is of no importance. Such a displacement of the blowpipe is also advantageous for beginning a cut to be made at right angles to the edge of a metal sheet or for finishing such a cut.

The cutting machine can be made so compact and of so low a weight that it may conveniently be carried with one hand. To facilitate rapid transport it may have a release mechanism for disconnecting the speed governor, or an additional pair of wheels which normally depend freely but on which the machine can be placed so that the ordinary travelling wheels are lifted off the base.

The cutting machine is otherwise equipped with such prior art details as are usually to be found in machines of this type, such as gas hoses and valves, electric lines with switches for the speed governor, if it is an electric motor, and means for adjusting the r.p.m. and direction of rotation of the speed governor.

In rectilinear cutting the machine may of course be steered by means of a ruler or by a direct fixed interconnection of the two travelling wheels, and in circular cutting it may be arranged as a beam trammel. It can also cut disks within certain diameter limits by locking one travelling wheel so that it forms the center of rotation. If the distance of the blowpipe from the travelling wheels has then to be changed, this change can be compensated for by an adjustment of the r.p.m. of the speed governor.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A flame cutting machine comprising: a carriage; a pair of coaxial travelling wheels rotatably mounted on said carriage; a support member on said carriage providing, with said wheels, at least a three point support for engagement with a plane surface of a workpiece; a blowpipe means secured on said carriage, disposed a spaced distance to one side of said pair of wheels and directed to a position substantially on a prolongation of the straight line between the points of support of said wheels on the plane surface; a speed governed power supply means including gear means carried by said carriage and drive connected with said wheels; said gear means including a differential device enabling a speed governed drive through said wheels to provide a constant governed progressive movement of said blowpipe means along the workpiece and at the same time to enable forward, reverse and relative rotations of said pair of wheels, to guide the direction of movement of said flame cutting machine, solely by application of an external guiding force.

2. A work performing machine comprising: a carriage; a pair of coaxial travelling wheels rotatably mounted on said carriage; a support member on said carriage providing, with said wheels, at least a three point support for engagement with a plane surface of a workpiece; a work performing means secured on said carriage and disposed a spaced distance to one side of said pair of wheels with its work engaging portion substantially on a prolongation of the straight line between the points of support of said wheels on the plane surface; a speed governor carried by said carriage and gear means carried by said carriage and drive connected between said speed governor and said wheels to enable a constant governed progressive movement of said work performing means along the workpiece, said gear means including a differential device enabling forward, reverse and relative rotations of said pair of wheels on guiding the direction of movement of said work performing means by application of an external guiding force.

3. A work performing machine as defined in claim 2 wherein said differential device includes two primary coaxial, relatively rotatable gear members and an epicyclic assembly with a carrier member coaxial with and rotatably relative to said two primary gear members with planet gear means meshed with said two primary gear members; one of said members being drive connected to said speed governor and each of the remaining two of said members being drive connected to an associated one of said wheels; the gearing drive, in the absence of application of external guiding force on the movement of said machine, between said one member and the one wheel closest to said work performing means providing an opposite direction of rotation than the gearing drive between said one member and the other of said two wheels and a drive ratio to said one wheel having a relationship to the drive ratio to the other wheel which is directly proportional to the relationship between the distance of said one wheel from said work performing means and the distance of said other wheel from said work performing means.

4. A work performing machine as defined in claim 3 wherein said one member is one of said two primary gear members, the member connected to said one wheel is said carrier member and the member connected to said other wheel is the other of said two primary gear members.

5. A work performing machine as defined in claim 3 wherein said one member is said carrier member, a first gear train connects one of said two primary gears to one of said wheels and a second gear train having one more gear than said first gear train connects the other of said two primary gears to the other of said wheels.

6. A work performing machine as defined in claim 3 wherein said differential device is a planetary type epicyclic gearing with a sun gear member, a ring gear member and a planetary assembly including a carrier member with at least one planet gear enmeshed with said sun gear member and said ring gear member; said ring gear member being said one member; said planet carrier member being the member connected to the wheel closest to said work performing means; and said sun gear member being the member connected to the other wheel.

7. A work performing machine as defined in claim 2, wherein said speed governor is a speed governed electric motor for moving said carriage.

8. A work performing machine as defined in claim 2, wherein said carriage is movable only by application of external force and said governor is a centrifugal governor for limiting the utilization of the external force by braking.

9. A machine adapted to carry to tool over a workpiece at constant speed along an optionally curved path comprising: a carriage having a pair of coaxial travelling wheels and adapted to support the tool at its one side outside the travelling wheel of that side and provided with a speed governor; a transmission connecting said governor to the one of said travelling wheels located on the tool side to control the speed thereof; said transmission containing a differential device; and means connecting the second of said travelling wheels to said differential device to add the rotation applied to said second travelling wheel by the movement on the workpiece of said carriage steered by an external guiding force, to the rotation of said one speed governed travelling wheel under such transmission ratios that the speed of the tool is always substantially proprotional to that of said governor.

References Cited in the file of this patent
UNITED STATES PATENTS

| | | |
|---|---|---|
| 874,852 | Lorenz | Dec. 24, 1907 |
| 2,183,605 | Bucknam et al. | Dec. 19, 1939 |
| 2,586,907 | Bernard | Feb. 26, 1952 |

FOREIGN PATENTS

| | | |
|---|---|---|
| 7,080 | Great Britain | May 1, 1884 |